July 4, 1967  G. DORSCH  3,329,833
HALL EFFECT TRANSDUCER FOR SCANNING MAGNETIC SCALE INDICIA
Filed July 21, 1964  2 Sheets-Sheet 1

3,329,833
HALL EFFECT TRANSDUCER FOR SCANNING
MAGNETIC SCALE INDICIA
Gerhard Dorsch, Weissenbrunn, Germany, assignor to Siemens - Schuckertwerke Aktiengesellschaft, Berlin-Siemensstadt and Erlangen, Germany, a corporation of Germany
Filed July 21, 1964, Ser. No. 384,225
Claims priority, application Germany, July 25, 1963, S 86,367
11 Claims. (Cl. 307—88.5)

ABSTRACT OF THE DISCLOSURE

A plurality of at least three Hall plates are serially aligned in a direction of travel coincident with the direction of the Hall voltage axes. The Hall plates are regularly spaced from each other a distance corresponding to one half period of a magnetized scale indicia to be scanned. The respective Hall voltages of the Hall plates are electrically connected in series to provide a sum voltage which is available as the transducer output. The pair of control current terminals of each Hall plate are connected to a current source separate from those of the other Hall plates.

---

My invention relates to a transducer for scanning periodically repetitive magnetic signals. More particularly, my invention relates to a transducer which responds to magnetized graduation of a measuring scale. The measuring scale or machine structure may extend, for example, along the travel path of a tool in a machine so that the transducer traveling with the tool carrier passes the scale graduations, responds magnetically to such scale graduations and issues corresponding signal pulses which can be used for controlling the operation and/or movement of the tool.

Similar transducers are also applicable for various other control and regulating purposes such as for remotely indicating or positionally controlling a movable structure.

It is known to provide magnetically responsive transducers with Hall generators. A Hall generator has the advantage of furnishing a voltage signal when the transducer is at standstill relative to the scale graduations, thus facilitating in many cases an accurate control at slow travel speeds and affording a precise positioning to a predetermined location. In such transducers, the Hall generator is mounted in a field gap of a magnetic circuit which travels relative to the sequence of magnetized scale graduations.

For high-accuracy requirements, however, the remanent magnetizations in the iron-containing magnetic circuit of the scanning transducer may become troublesome. They displace the voltage zero passages of the generated Hall voltage so that the control signals issue from the transducer at a locality of a travel path which is more or less spaced from the accurate datum position. Another source of error is the fact that the distances between the supposedly uniformly spaced magnetizations of the graduated scale are actually somewhat non-uniform because of imperfections in manufacture or inhomogeneities of the material, so that the signals issuing from the scanning transducer also involve statistically distributed errors.

It is an object of my invention to eliminate the above-mentioned deficiencies of known scanning transducers equipped with Hall generators.

To accomplish this, and in accordance with my invention, I provide the transducer with a number of Hall plates which are serially aligned in the travel direction coincident with the direction of the Hall voltage axes. The Hall plates are regularly spaced from each other a distance corresponding to one-half period of the magnetized scale indicia to be scanned. The respective Hall voltages of these plates are electrically connected in series to provide a sum voltage which is available as the transducer output. Each Hall plate has its pair of control-current terminals connected to a current source separate from those of the other Hall plates. At least three, and preferably more of such Hall plates, are provided; it being of advantage to utilize a total of ten Hall plates in the aforedescribed arrangement and connection.

The Hall generators, according to another feature of the invention, are deposited on a ceramic carrier plate, for example, of sintered alumina or sintered ceramic ferrite, which may have high magnetic permeability. For this purpose, the carrier plate may first be provided with a foil of galvanomagnetic metal, preferably indium antimonide or indium arsenide. The Hall plate may thereafter be produced from the foil by eliminating the unnecessary portions of the foil, preferably by the method of contour etching known and employed in semiconductor manufacturing techniques. The use of the contour etching process permits the scanning transducer to have extremely small dimensions, thus affording plural-track scanning with small space requirements.

By employing a non-magnetic carrier plate of ceramic material, remanence phenomena in the transducer can be completely avoided. However, such phenomena are hardly appreciable even if, for increasing the magnetic induction, the Hall generators are disposed on a magnetizable plate of ferrite. This is due to the fact that high flux concentrations are avoided by the aforedescribed geometric design of the scanning transducer.

The provision of several Hall generators according to the invention, not only has the effect of increasing the total signal voltage, but also permits averaging the responses of the respective Hall generators to the corresponding, individual scale graduations. This provides an increased accuracy because individual faulty indicia have only a slight effect upon the total signal voltage. The multiple Hall generator transducer has a further advantage, since the ohmic zero components of the individual Hall generators become effective only as to their statistical average amount.

According to still another feature of the invention, it is advisable to have adjacent Hall generators of the transducer traversed by control currents of mutually opposed directions. One manner of accomplishing this is to pass respective direct currents through the Hall generators and reverse the polarity of the direct current in each adjacent Hall generator so that alternate Hall generators have the same polarity. A simpler circuitry is provided, however, by connecting the control-current circuits of the Hall generators to respective secondary windings of a transformer of which adjacent windings are provided with polarities in opposition to each other so that alternate windings have the same polarity. In each case, such a transducer is largely insensitive to spurious magnetic fields because they act homogeneously on the entire semiconductor layer so that any resulting disturbing effects compensate each other in mutually adjacent Hall generators.

The aforedescribed magnetizations which are to constitute a scale of graduations to be responded to by a transducer according to the invention, may be produced in the conventional manner. Inductive transducers may be utilized. The inductive transducer consists essentially of an electromagnet which has a ferromagnetic core with an air gap of 0.5 mm., for example. A winding on the magnetic core is energized by electric current so that when the transducer is moved along a magnetizable and sufficiently remanent structure, the air gap is close to the structure for the purpose of recording the magnetic graduations and a periodic record is produced.

A north pole magnetization may thus follow a south pole magnetization, for example, at a distance of 1 mm., corresponding to a half period. This may be accomplished at a speed of 2 to 5 pulses per second. It will be understood that the production of the magnetic signals is not essential to the invention proper and may be effected in any suitable manner.

In order that the invention may be readily carried into effect, it will now be described with reference to the accompanying drawings, wherein.

Figure 1:
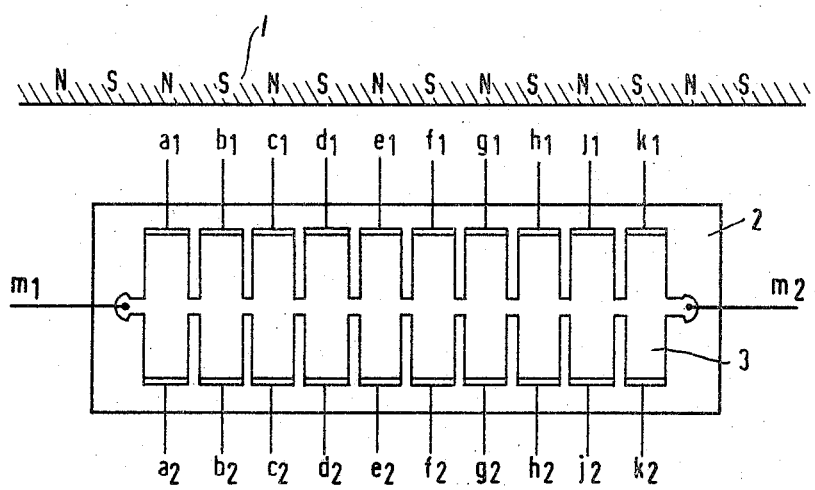
FIG. 1 is a plan view, on an enlarged scale and in operative proximity to a schematically illustrated scale of magnetized graduations, of an embodiment of the transducer of the present invention.

In FIG. 1, a scanning transducer cooperates with a periodic magnetic scale 1. The scale 1 may comprise a strip consisting of hard-magnetic material which is alternately magnetized to provide north poles N and south poles S following each other at distances of 1 mm. Thus, in the scale 1, alternate magnetizations are of the same polarity; the odd magnetizations being of N polarity in FIG. 1 and the even magnetizations being of S polarity in FIG. 1. Adjacent magnetizations have opposite polarities in the scale 1 of FIG. 1.

The active portion of the scanning transducer consists of a semiconductor coating 3 on the planar top surface of a carrier plate 2 of ferrite or other ceramic material such as, for example, a material known in the trade under the name Degussit. The dimensions of the carrier plate 2 may be 12 mm. by 4 mm. by 3 mm., for example. The semiconductor layer 3, consisting of InSb or InAs, may be shaped by contour etching so as to form a plurality, such as 10, Hall generators or plates whose respective Hall voltage electrodes are all in series connection with each other. The two Hall voltage electrodes at the ends of the assembly are attached to leads $m_1$ and $m_2$ between which the transducer output voltage is available.

Each Hall plate has a voltage axis and a pair of voltage electrodes on its voltage axis. The Hall plates are positioned in serial alignment in the direction of their voltage axes and are spaced from each other a distance between adjacent Hall plates corresponding to a half period of the scale indicia.

Each individual Hall plate is of elongated substantially rectangular shape and has its two narrow sides provided with respective current-supply terminals to which respective leads $a_1$, $a_2$ to $k_1$, $k_2$ are attached. The individual Hall generators are 0.8 mm. wide, the spacing between them being 0.2 mm. These dimensions, of course, are to be taken by way of example only, and relate to the scanning of a scale whose half period, that is, the distance between adjacent north and south poles, is 1 mm. For other scale divisions, such as those graduated on the basis of inches, correspondingly other dimensions of the Hall generators are needed.

When the transducer of FIG. 1 is shifted along the graduated scale 1, each individual Hall generator produces a component Hall voltage. The control current supplied to the two leads $a_1$, $a_2$ of the first generator and separately supplied through the corresponding two leads of each other Hall generator is of opposite polarity in each two adjacent Hall generators. Thus, for example, odd numbered Hall generators may be supplied with positive polarity current, whereas even numbered Hall generators may be supplied with negative polarity current, and vice versa. Consequently, the component Hall voltages in all of the ten Hall generators have the same direction at any moment and in any position of the transducer relative to the graduated scale. The output leads $m_1$ and $m_2$ thus provide a resultant voltage which is the sum of the component voltages. As the transducer moves along the graduated scale, the output voltage is an approximately sinusoidal function of the change in position of said transducer. This voltage can be used, for example, for the digital measurement of a displacement by counting or otherwise processing the number of voltage zero passages or the maxima or minima of the output voltage.

Figure 2:
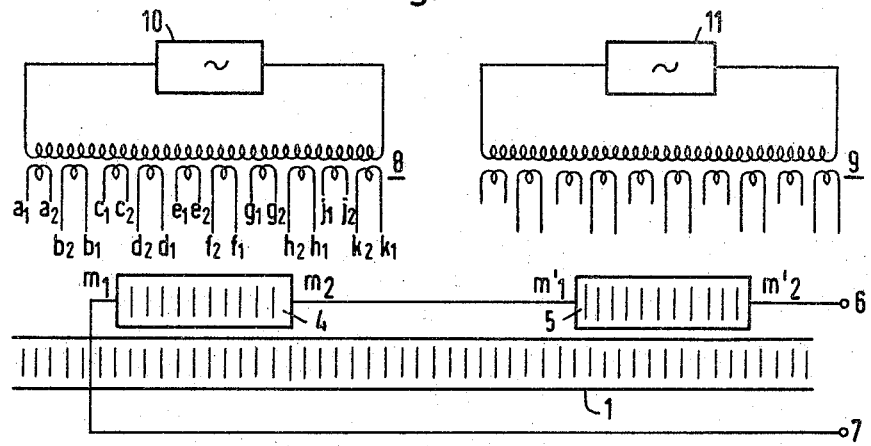
FIG. 2 is a schematic diagram of an embodiment of the transducer of the present invention, comprising two component transducers of the embodiment of FIG. 1 and the sources of control current.

For programming purposes, for example, in cases where the signal voltage furnished by the transducer is used for controlling a feed drive to place the controlled movable structure to a predetermined position which may be located somewhere between two scale indicia, such as N and S, two scanning transducers are needed which are mechanically coupled to each other to travel simultaneously, but which are displaced 90 electrical degrees from each other. FIG. 2 illustrates two such combined transducers.

In FIG. 2, the magnetized indicia of the scale 1 are diagrammatically indicated by vertical lines. Two scanning transducers 4 and 5, each corresponding to the embodiment of FIG. 1, have their respective Hall voltage output leads $m_1$, $m_2$ and $m'_1$, $m'_2$ connected in series so that the total sum of the Hall voltages is available at the output terminals 6 and 7. The current flow axes in each scanner 4 and 5 are symbolically indicated by vertical lines.

Two transformers 8 and 9 serve to supply control current to the Hall plates of the two scanning transducers and are connected to suitable AC voltage sources 10 and 11, respectively. Each of the transformers 8 and 9 has ten mutually isolated secondary windings. The secondary windings of the transformer 8 are connected to the current supply leads $a_1$, $a_2$ to $k_2$, $k_1$ of the ten Hall plates of the scanning transducer 4. The secondary windings of the transformer 9 are analogously connected to the current supply leads of the respective Hall plates of the scanning transducer 5.

The two scanning transducers 4 and 5 of FIG. 2 are displaced from each other 90 electrical degrees. That is, when the axes of the Hall generators in the scanning transducer 4 coincide with respective indicia on the scale 1, the axes of the scanning transducer 5 are located half way between the indicia of said scale. The sum voltage at the output terminals 6 and 7 has a phase position which depends upon the amplitudes of the individual Hall voltages from the transducers 4 and 5. Consequently, the output voltage from terminals 6 and 7 may be utilized for programming in the manner of known synchro systems. This permits prescribing a travel distance which contains any desired fraction of the scale period. The same results may be achieved by suitably selecting the amplitudes of the control currents.

In practice it is often advisable to have the semi-conductor layer 3 extend to the edge of the carrier plate 2, so that the current supply leads $a_1$, $a_2$ to $k_1$, $k_2$ may be soldered to said semiconductor layer in a plane perpendicular to the plane of the said semiconductor layer. This avoids sharp bends in the lead wires and permits a component, despite its small size, to be more readily connected into the circuitry.

Figure 4:
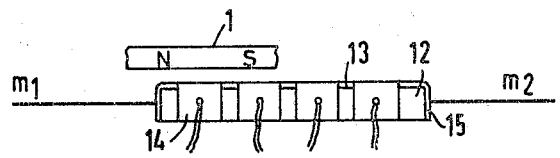
FIG. 4 is a side elevation of the embodiment of FIG. 3 including the graduated scale and excluding the current supply source.
Figure 3:
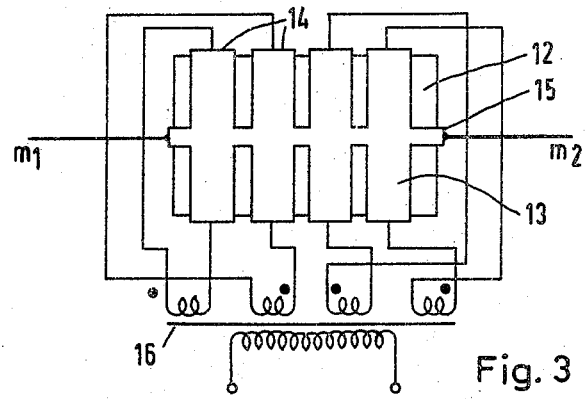
FIG. 3 is a plan view of an embodiment of the transducer of the present invention and the current supply source.

These features are included in the embodiment of the transducer of FIGS. 3 and 4. The transducer of FIGS. 3 and 4 corresponds essentially to the transducer of FIG. 1, except that only four Hall generators 13 are shown on the top surface of a carrier plate 12. The Hall generators 13 extend to the longitudinal edges of the carrier plate 12 and beyond these edges onto the sides of the carrier plate 12, so that the current supply lead may be connected to each of the Hall generators at 14, which is the narrow side of each Hall plate. The two Hall output electrodes of the end Hall plates also extend over the edge of the carrier plate 12. The output electrodes extend over the narrow edges of the carrier plate 12 so that the wires $m_1$ and $m_2$ may be connected at the narrow sides thereof as at 15.

In FIG. 3, each of the Hall plates 13 is connected to a corresponding one of the secondaries of a current supply transformer 16. Each Hall plate has a polarity opposite to the polarity of the adjacent Hall plates, so that at any moment the current flow in each Hall plate is in a direction opposite to the direction of current flow in each adjacent Hall plate.

It will be understood that in operation the plane of the Hall plate is parallel and close to the plane of the measuring scale 1 which includes the alternately polarized magnetic indicia. This is clearly shown in FIG. 4.

Figure 5:
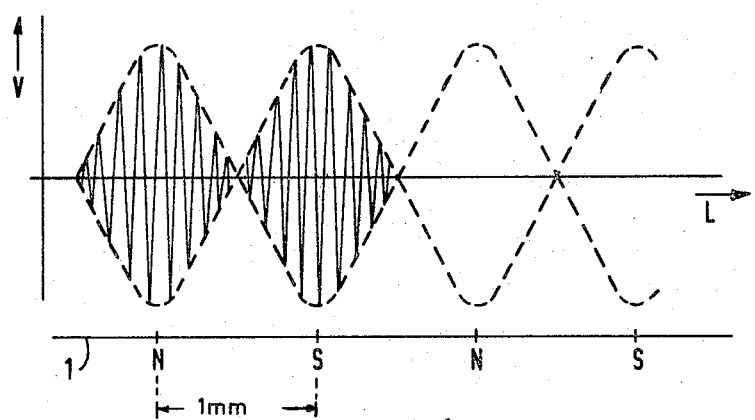
FIG. 5 is a graphical illustration of one of the types of output voltage obtainable with a transducer of the present invention.

FIG. 5 illustrates one of the possible types of output voltage obtainable with a transducer of the present invention. The abscissa denotes the travel length L and corresponds to the measuring scale 1, which is diagrammatically represented beneath the curve. The ordinate indicates the voltage V. When the Hall plates are energized by DC voltages of alternately opposed polarities, the Hall output voltage is approximately a sinusoidal function of the travel length L. When the Hall plates are energized by AC voltages having a frequency which is high in comparison with the travel speed of the transducer, the output voltage has a varying amplitude and the corresponding envelope curve, shown by broken lines in FIG. 5 is a sinusoidal function of the travel length.

While the invention has been described by means of specific examples and in specific embodiments, I do not wish to be limited thereto, for obvious modifications will occur to those skilled in the art without departing from the spirit and scope of the invention.

I claim:

1. A transducer for response to periodically repetitive magnetic scale indicia consisting of magnetizations of alternate polarities, comprising a multiplicity of Hall plates serially aligned in the direction of their Hall voltage axes and regularly spaced from each other a distance corresponding to one-half period of the scale indicia, said Hall plates having their respective Hall-voltages electrically connected in series to furnish a joint output and having respective pairs of control current terminals, and electrically separate current source means connected to said respective pairs of terminals.

2. A transducer responsive to periodically repetitive magnetic scale indicia consisting of magnetization of alternate polarities, each adjacent two indicia of which together form a period and each single indication of which forms a half period, comprising
   a plurality of Hall plates each having a pair of current terminals, a voltage axis and a pair of voltage electrodes on its voltage axis;
   said Hall plates being positioned in serial alignment in the direction of their voltage axes and spaced from each other a distance between adjacent Hall plates corresponding to a half period of said scale indicia;
   connecting means electrically connecting the voltage electrodes of said Hall plates in series to provide a resultant Hall voltage;
   current supply means connected to the current terminals of each of said Hall plates for supplying a separate current to each of said Hall plates; and
   output means connected to the voltage electrodes of selected ones of said Hall plates for deriving the resultant Hall voltage from said transducer.

3. A transducer as claimed in claim 2, wherein said current supply means supplies a current of one polarity to the current terminals of a Hall plate and a current of the opposite polarity to the current terminals of the adjacent Hall plates so that adjacent ones of said Hall plates are supplied currents of opposite polarity.

4. A transducer as claimed in claim 2, wherein said current supply means comprises transformer means having a plurality of mutually insulated secondary windings each connected to the current terminals of a corresponding one of said Hall plates.

5. A transducer as claimed in claim 2, wherein said current supply means comprises transformer means having a plurality of mutually insulated secondary windings, each wound to provide a current of a polarity opposite that of the current provided by adjacent windings so that adjacent ones of said secondary windings provide currents of opposite polarity, and each connected to the current terminals of a corresponding one of said Hall plates.

6. A transducer responsive to periodically repetitive magnetic scale indicia consisting of magnetizations of alternate polarities, each adjacent two indicia of which together form a period and each single indication of which forms a half period, comprising
   a carrier plate of ceramic material;
   a plurality of Hall plates each having a pair of current terminals, a voltage axis and a pair of voltage electrodes on its voltage axis, said plurality of Hall plates comprising a coating of semiconductor material on said carrier plate shaped in a manner whereby said Hall plates are in serial alignment in the direction of their voltage axes and spaced from each other a distance between adjacent Hall plates corresponding to a half period of said scale indicia and the voltage electrodes of said Hall plates are connected in series to provide a resultant Hall voltage;
   current supply means connected to the current terminals of each of said Hall plates for supplying a separate current to each of said Hall plates; and
   output means connected to the voltage electrodes of selected ones of said Hall plates for deriving the resultant Hall voltage from said transducer.

7. A transducer as claimed in claim 6, wherein said current supply means supplies a current of one polarity to the current terminals of a Hall plate and a current of the opposite polarity to the current terminals of the adjacent Hall plates so that adjacent ones of said Hall plates are supplied currents of opposite polarity.

8. A transducer as claimed in claim 6, wherein said current supply means comprises transformer means having a plurality of mutually insulated secondary windings each connected to the current terminals of a corresponding one of said Hall plates.

9. A transducer as claimed in claim 6, wherein said current supply means comprises transformer means having a plurality of mutually insulated secondary windings, each wound to provide a current of a polarity opposite that of the current provided by adjacent windings so that adjacent ones of said secondary windings provide currents of opposite polarity, and each connected to the current terminals of a corresponding one of said Hall plates.

10. A transducer as claimed in claim 6, wherein said carrier plate comprises a ferrite.

11. A transducer arrangement responsive to periodically repetitive magnetic scale indicia consisting of magnetizations of alternate polarities, each adjacent two indicia of which together form a period and each single indication of which forms a half period, comprising
   a first plurality of Hall plates each having a pair of current terminals, a voltage axis and a pair of voltage electrodes on its voltage axis,
   said Hall plates being positioned in serial alignment in the direction of their voltage axes and spaced from each other a distance between adjacent Hall plates corresponding to a half period of said scale indicia;
   connecting means electrically connecting the voltage electrodes of said Hall plates in series to provide a resultant Hall voltage;

current supply means connected to the current terminals of each of said Hall plates for supplying a separate current to each of said Hall plates ;

output means connected to the voltage electrodes of selected ones of said Hall plates for deriving the resultant Hall voltage from said first plurality of Hall plates;

a second plurality of Hall plates displaced 90 electrical degrees from said first plurality of Hall plates, each of said second plurality of Hall plates having a pair of current terminals, a voltage axis and a pair of voltage electrodes on its voltage axis, the Hall plates of said second plurality of Hall plates being positioned in serial alignment in the direction of their voltage axes and spaced from each other a distance between adjacent Hall plates corresponding to a half period of said scale indicia;

connecting means electrically connecting the voltage electrodes of the Hall plates of said second plurality of Hall plates in series to provide a resultant Hall voltage;

current supply means connected to the current terminals of each of the Hall plates of said second plurality of Hall plates supplying a separate current to each of said Hall plates;

output means connected to the voltage electrodes of selected ones of the Hall plates of said second plurality of Hall plates for deriving the resultant Hall voltage from said second plurality of Hall plates; and combined output means connected to the output means of said first and second pluralities of Hall plates for deriving the combined resultant Hall voltages from said transducer arrangement.

References Cited
UNITED STATES PATENTS

| | | | |
|---|---|---|---|
| 3,082,507 | 3/1963 | Kuihrt et al. | 307—88.5 X |
| 3,219,909 | 11/1965 | Foster | 307—88.5 X |
| 3,243,692 | 3/1966 | Heissmeier et al. | 307—88.5 |

ARTHUR GAUSS, *Primary Examiner.*

B. P. DAVIS, *Assistant Examiner.*